United States Patent
Kochpatcharin et al.

(10) Patent No.: US 7,069,533 B2
(45) Date of Patent: Jun. 27, 2006

(54) SYSTEM, APPARATUS AND METHOD FOR AUTOMATED TAPEOUT SUPPORT

(75) Inventors: Danchai Kochpatcharin, Singapore (SG); Jennifer Teong Su Ping, Singapore (SG); Yee Hwee Phuan, Singapore (SG); Elizabeth Lim, Singapore (SG); Kenneth Ngeow Zoo Khean, Singapore (SG); Winson Yong, Sunnyvale, CA (US)

(73) Assignee: Chatered Semiconductor Manufacturing, LTD, Singapore (SG)

( * ) Notice: Subject to any disclaimer, the term of this patent is extended or adjusted under 35 U.S.C. 154(b) by 16 days.

(21) Appl. No.: 10/389,718

(22) Filed: Mar. 14, 2003

(65) Prior Publication Data

US 2004/0181769 A1  Sep. 16, 2004

(51) Int. Cl.
G06F 17/50 (2006.01)
(52) U.S. Cl. .............................. 716/19; 716/20; 716/21
(58) Field of Classification Search ................ 716/4–6, 716/19–21; 250/492.23; 438/14; 700/121
See application file for complete search history.

(56) References Cited

U.S. PATENT DOCUMENTS

| 4,835,704 | A | * | 5/1989 | Eichelberger et al. | ......... 716/21 |
| 5,696,943 | A | * | 12/1997 | Lee | ................. 716/4 |
| 5,717,928 | A | * | 2/1998 | Campmas et al. | ............ 716/17 |
| 6,031,981 | A | * | 2/2000 | Lee et al. | ...................... 716/10 |
| 6,128,588 | A | * | 10/2000 | Chacon | .......................... 703/6 |
| 6,260,177 | B1 | * | 7/2001 | Lee et al. | ...................... 716/2 |
| 6,303,251 | B1 | * | 10/2001 | Mukai et al. | ................... 430/5 |
| 6,415,421 | B1 | * | 7/2002 | Anderson et al. | .............. 716/4 |
| 6,622,295 | B1 | * | 9/2003 | Schepp et al. | ................. 716/19 |
| 6,756,242 | B1 | * | 6/2004 | Regan | ........................... 438/14 |
| 6,760,640 | B1 | * | 7/2004 | Suttile et al. | ................ 700/121 |
| 6,774,380 | B1 | * | 8/2004 | Abe | ....................... 250/492.23 |
| 6,842,881 | B1 | * | 1/2005 | Croke et al. | .................... 716/1 |
| 2001/0052107 | A1 | * | 12/2001 | Anderson et al. | ............... 716/4 |
| 2002/0100005 | A1 | * | 7/2002 | Anderson et al. | ............... 716/5 |
| 2003/0062489 | A1 | * | 4/2003 | Abe | ....................... 250/492.23 |
| 2003/0177469 | A1 | * | 9/2003 | Suttile et al. | .................. 716/21 |
| 2003/0179605 | A1 | * | 9/2003 | Riesenman et al. | ..... 365/189.01 |
| 2003/0233630 | A1 | * | 12/2003 | Sandstrom et al. | ............ 716/19 |
| 2004/0054633 | A1 | * | 3/2004 | Huyghe et al. | ................ 705/75 |
| 2004/0093471 | A1 | * | 5/2004 | Riesenman et al. | .......... 711/154 |
| 2004/0107412 | A1 | * | 6/2004 | Pack et al. | ..................... 716/19 |
| 2004/0128643 | A1 | * | 7/2004 | Buechner et al. | .............. 716/21 |
| 2004/0133369 | A1 | * | 7/2004 | Pack et al. | ..................... 702/59 |

* cited by examiner

*Primary Examiner*—Vuthe Siek
*Assistant Examiner*—Naum Levin
(74) *Attorney, Agent, or Firm*—William J. Stoffel

(57) ABSTRACT

A system, apparatus and method for changing/modifying a customer specific reticle set design to a reticle set design that meets a user's process standard. An example embodiment of a method of modifying layout information representing a reticle set design for an integrated circuit comprising the following:

receiving layout information and job information; and storing the layout information and the job information; the layout information representing a reticle set design for an integrated circuit and the job information related to the reticle set design;

modifying the layout information and the job information to put the layout information and the job information into a first process compatible format;

using the layout information and the job information to create mask writer format information for the reticle set design; and storing the mask writer format information; and outputting the mask writer format information.

In other embodiments, the method further comprises receiving changes and/or approval for said mask writer format information; and releasing the mask write format information to a mask shop.

15 Claims, 15 Drawing Sheets

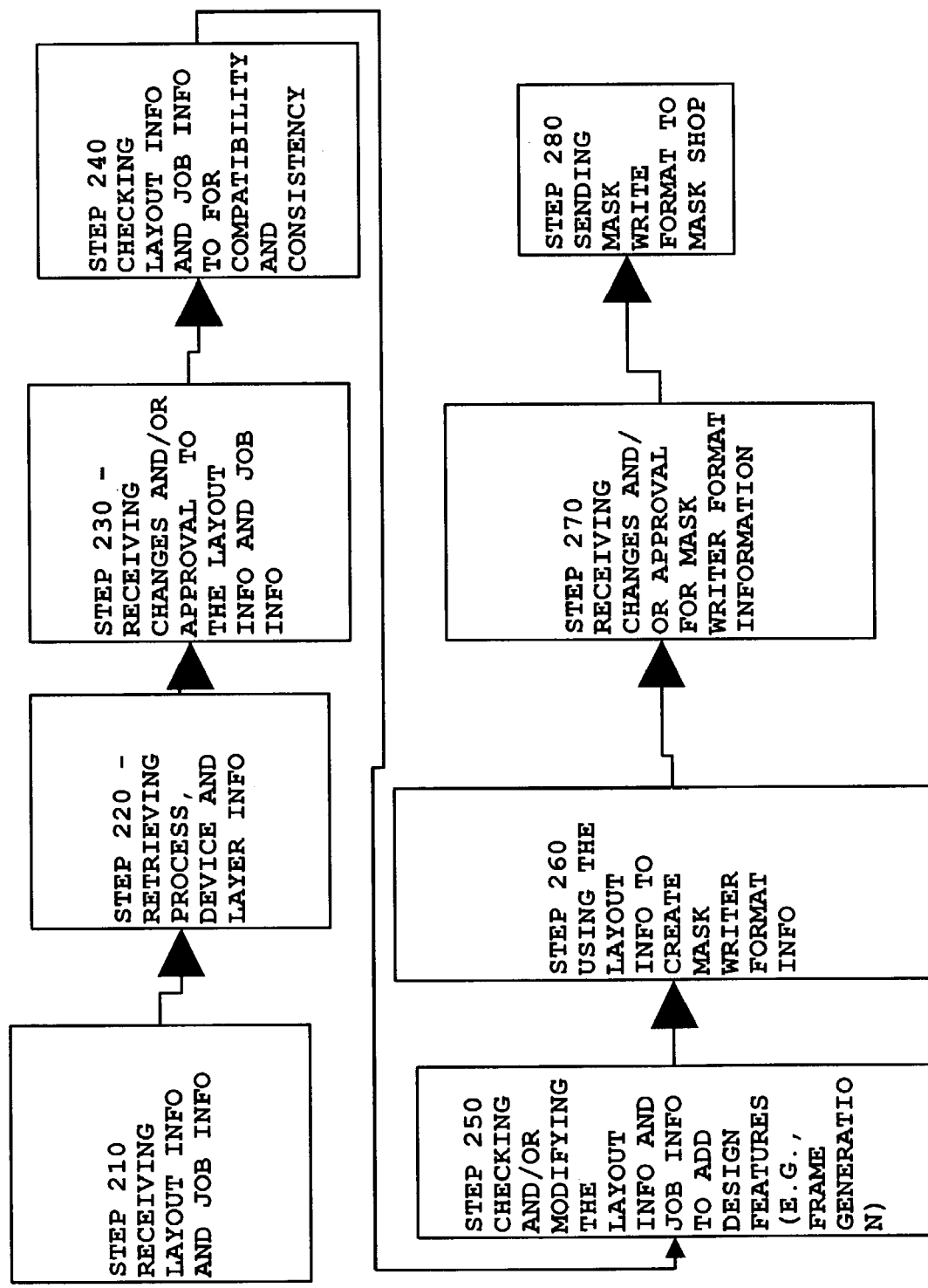

Section A: Customer information

Customer ID        1312
Customer name      NULL
Primary contact    NULL
phone              NULL
Fax                NULL
email contact      NULL
=========================================

Section B: Device information device ID (as in STF)    [_dummy device_]    FTATV-U01
                                              FTATY-U01
                                              FTATV-U02 click box to select process ID  [ ]           SN214-00A
                                              SN215-00A
Process ID       [ ]                          SN215-00B Click to Generate process
       information

FIGURE 7A

SCRIBE LINE DROP IN
   1)  CLICK HER TO DOWNLOAD THE TEMPLATE FOR
        SCRIBE LINE STRUCTURE
   2)  FILL-IN THE DOCUMENT AND SAVE IN YOUR
        LOCAL HARD DRIVE
   3)  ATTACHES THE SAME DOCUMENT THROUGH THE LINK "ADD/
        REMOVE ATTACHMENTS" (AFTER SAVING CURRENT FORM)

CUSTOMER PO NUMBER    P012345
SUBMISSION REASON:     NEW PROTOTYPE
CUSTOMER FLOOR PLAN   [ ] YES [ * ] NO
POLYMIDE:                   [ ] YES [ * ] NO
CUSTOMER TO JOBVIEW?  [ ] YES [ * ] NO
JOBVIEW GRATING BY CUSTOMER? [ ] YES [ * ] NO
SPICE MODEL SPECIFICATION [SM-TX-0412 ]    REV: [1A]
DESIGN RULE SPECIFICATION
USED                  [Y1-093-DR01         REV: [1L]
ET AL. SPEC USED       [NO]                   REV: [N/A]
LIBRARY USED:              [ ] YES [ * ] NO
[ ] ADVANT!     [ ] STD CELL
[ ] ARTISAN     [ ] STD CELL
[ ] VIRAGE      [ ] MEMORIES
[ ] OTHER IPS   [
TAPEOUT FORMAT:    GDSII
BACKGRIND THICKNESS"  [19 MILS ]

FIGURE 7C

Section C: Design Rule Check Information

HELP <u>Customer Information</u> <u>Device and Tapeout Information</u> <u>DRC Information</u> <u>Frame Information</u> <u>GDSII Database Information</u>

First Tapeout to Chartered: ◉ Yes ○ No

◉ Path 1 ○ Path 2
◉ Chartered Runs DRC ○ Customer Runs DRC (Please Attach DRC Report)

* Path1 : Run DRC and close DR violations review prior to release for mask making.
* Path2 : Run DRC and close DR violations review in RTP plan.

Section D: Frame Information

HELP <u>Customer Information</u> <u>Device and Tapeout Information</u> <u>DRC Information</u> <u>Frame Information</u> <u>GDSII Database Information</u>

Do you want Guard Ring to be added: ◉ Yes ○ No

Chartered Default Guard Ring Spacing is 10μm. Special Requirement on Guard Ring Spacing? ◉ Yes ○ No Space to Guard Ring(in microns): [10]

Chartered Default Assembly Die size increment is 10μm. Please specify if otherwise ◉ Yes ○ No
Special Requirements for Assembly Die Size Assembly Die Size increment: [5.0]
X value(in microns): [0.0]  Y value(in microns): [0.0]

FIGURE 7D

Section E:GDSII Database Information

HELP Customer Information Device and Tapeout Information DRC Information Frame Information GDSII Database Information

Header Information

Top Cell Name: [DUMMYTOPCELL]

Anti Clockwise Orientation: ○ 0 Degree  ● 90 Degrees  ○ 180 Degrees  ○ 270 Degrees Database Scale: ● 1X  ○ 2X  ○ 4X  ○ 5X E-Beam Shrink to: [100.0] %

FTP Information

Site: [ftp2]

Directory: [/DEMO1/GDS_FTP]

File Name: [gdsfilename1.gz]

File Size(in bytes): [1288429]

Final File Size(in bytes): [7225344]

Window Co-ordinates (in microns)

Lower left hand X coordinate: [-2913.0]   Lower left hand Y coordinate: [-4060.5]

Upper right hand X coordinate: [2913.0]   Upper right hand Y coordinate: [4060.5]

FIGURE 7E

Layer Information

| Sel. | Mask Layer No. | PTRF Layer Name | OPC/PSM | Sizing per Side | Digitized Area Polarity | Rev. | ROM Code | Cust. GDSII# | Data Type | Cust. DB Grid Size | Logical Operation |
|---|---|---|---|---|---|---|---|---|---|---|---|
| ▷ | 10 | COMP | OPC | 0.00 | Dark | A2 | | NIL | 30.31.32 | 0.0050 | Chartered Std. |
| ▷ | 05 | N-WELL | NONE | 0.00 | Clear | A2 | | NIL | 0 | 0.01 | Usr_Layer1 OR Usr_Layer2 |
| ▷ | 15 | P-FIELD | NONE | 0.00 | Dark | A2 | | NIL | 0 | 0.01 | Chartered Std. |
| ▷ | 59 | Predope | NONE | 0.00 | Dark | A2 | | NIL | 0 | 0.01 | ((((POLY2 AND P+) AND ((COMP AND N− |
| ▷ | 60 | POLY2 | OPC | 0.00 | Dark | A2 | | NIL | 0 | 0.0 | Chartered Std. |
| ▷ | 61 | ThinNgat | NONE | 0.00 | Clear | A2 | | NIL | 0 | 0.0 | Chartered Std. |

FIGURE 7F

FRAME DIMENSION AND SIZING TABLE (Revision 1B)

Process: SLI12-DC1-S*-A (FEOL in SMP), 6ENC1302-A (Single Damascene in CSP) and SLP-013um-002 (Contact in CSP)
Process: SLI1*-D00-S*-A (FEOL in SMP), 6ENC1302-A (Single Damascene in CSP) and SLP-013um-002 (Contact in CSP)
Process: SLI10-D00-S*-A (FEOL 3.3V/1.2V in SMP), SLI10-DC1-S*-A (FEOL 2.5V/1.2V in SMP)
Process: SLP-013UM-008 (BEOL Dual Damascene 1LM in CSP, SLP-013UM-009 (BEOL Dual damascene 3LM in CSP), SLP-013UM-010 (BEOL Dual Damascene

| MASK # | LAYER NAME | CD CELL TYPE | PITCH | DRAWN CD SPACE | DRAWN CD WIDTH | SIZING PER SIDE | CD CELL SIZE | SCRIBE LINE | FRAME STRUCTURE POLARITY | PELLICLE TYPE | OPC/PSM | Machine/MAG CODE |
|---|---|---|---|---|---|---|---|---|---|---|---|---|
| 10 | COMP | LINE | 0.36 | 0.21 | 0.15 | 0.00 | 0.15 | SPACE | CLEAR | K-248 | OPC, PSM | M: Nikon 4X Scanner |
| 11 | AD | SPACE | 1.12 | 0.72 | 0.40 | 0.00 | 0.40 | CHROME | DARK | K-248 | NA | M: Nikon 4X Scanner |
| 6 | DNwell | SPACE | 1.24 | 0.62 | 0.62 | 0.00 | 0.62 | CHROME | DARK | K-248 | NA | M: Nikon 4X Scanner |
| 4 | DPwell | SPACE | 1.24 | 0.62 | 0.62 | 0.00 | 0.62 | CHROME | DARK | K-248 | NA | M: Nikon 4X Scanner |
| 5 | NWELL | SPACE | 1.24 | 0.62 | 0.62 | 0.00 | 0.62 | CHROME | DARK | K-248 | NA | M: Nikon 4X Scanner |
| 15 | P-FIELD | SPACE | 1.24 | 0.62 | 0.62 | 0.00 | 0.62 | CHROME | CLEAR | K-248 | NA | M: Nikon 4X Scanner |
| 28 | Pvt Imp | SPACE | 0.62 | 0.31 | 0.31 | 0.00 | 0.31 | CHROME | DARK | K-248 | NA | M: Nikon 4X Scanner |
| 29 | Nvt Imp | SPACE | 0.62 | 0.31 | 0.31 | 0.00 | 0.31 | CHROME | DARK | K-248 | NA | M: Nikon 4X Scanner |
| 64 | TP | SPACE | 0.62 | 0.31 | 0.31 | 0.00 | 0.31 | CHROME | DARK | K-248 | NA | M: Nikon 4X Scanner |
| 61 | TN | SPACE | 0.62 | 0.31 | 0.31 | 0.00 | 0.31 | CHROME | DARK | K-248 | NA | M: Nikon 4X Scanner |
| 62 | HV_N | SPACE | 0.62 | 0.31 | 0.31 | 0.00 | 0.31 | CHROME | CLEAR | K-248 | NA | M: Nikon 4X Scanner |
| 6C | N-Pthu imp | SPACE | 0.62 | 0.31 | 0.31 | 0.00 | 0.31 | CHROME | DARK | K-248 | NA | M: Nikon 4X Scanner |
| 58 | Low Vtpn | SPACE | 0.62 | 0.31 | 0.31 | 0.00 | 0.31 | CHROME | DARK | K-248 | NA | M: Nikon 4X Scanner |
| 54 | Low Vtnn | SPACE | 0.62 | 0.31 | 0.31 | 0.00 | 0.31 | CHROME | DARK | K-248 | NA | M: Nikon 4X Scanner |
| 7D | PISCAP | SPACE | 0.80 | 0.40 | 0.40 | 0.00 | 0.40 | SPACE | CLEAR | K-248 | NA | M: Nikon 4X Scanner |
| 38 | DV | LINE | 1.55 | 0.86 | 0.69 | 0.00 | 0.69 | SPACE | CLEAR | K-248 | NA | M: Nikon 4X Scanner |
| 63 | Resistor | SPACE | 0.80 | 0.40 | 0.40 | 0.00 | 0.40 | CHROME | DARK | K-248 | NA | M: Nikon 4X Scanner |
| 59 | PD | SPACE | 0.62 | 0.31 | 0.31 | 0.00 | 0.31 | SPACE | DARK | K-248 | NA | M: Nikon 4X Scanner |
| 60 | POLY 2 | LINE | 0.31 | 0.18 | 0.13 | -0.005 | 0.12 | SPACE | CLEAR | K-248 | OPC, PSM | M: Nikon 4X Scanner |

FIGURE 8A

Frame Table

| | | | |
|---|---|---|---|
| Spec No. | CX-006-FT260 | | |
| Bias Table | SP-YI-09301-BT002.1F | Process Name | 6-L1818-12A-1833ZZ-0 00-01A |
| Technology | 0.18um Logic 8K For 2 Metal Process | | |
| Revision | 1B | | 6-L1818-12A-1833ZZ-0 00-01B |
| Revision Date | 12-Oct-01 | | |
| Request No | FC010918C,FC011012A | | |

| Cell Type | Cell Name | Size | Title |
|---|---|---|---|
| PME | pmca0121xe_03 | 2990um X 90um | |
| AVERN | avna0231x_07 | 2916um X 40um | |
| CDCELL | cdca0821x_01_opc1 | 1120um X 34um | |
| BARINBAR | bara0161x_07 | 4680um x 36um | |
| SCROT | srca0261x_04 | 30umX 112um | |
| MULTI | mmka0021x_03 | 290um X 46um | AA Mark 20P-4F |
| MULTI | mmka0031x_03 | 290um X 46um | AA Mark 20P-4FD |
| CANON | pama0011x98_02 | 76um X 76um | |
| ETSLM | etsa002_lo97_02h1_hdp | 74umX 1050um | ETS A002 L097 02 |

FIGURE 8B

SYSTEM, APPARATUS AND METHOD FOR AUTOMATED TAPEOUT SUPPORT

CROSS-REFERENCE TO RELATED APPLICATIONS

This application is related to co-pending U.S. patent application Ser. No. 10/389,477, filed Mar. 14. 2003, attorney docket no. CS02-039, inventors Kochpatcharin et al., entitled SYSTEM, APPARATUS AND METHOD FOR RETICLE GRADE AND PRICING MANAGEMENT, commonly assigned which is hereby incorporated by reference.

FIELD OF INVENTION

This invention relates a system, apparatus and method for modifying information used to manufacture masks or reticles used in semiconductor manufacturing and more specifically to a system, apparatus and method for automated tapeout support

BACKGROUND OF INVENTION

Electronic device makers, such as cell phone manufactures, computer manufactures, toy makers, use foundries or IC manufactures to make the chips used in their products. The electronic device makers make preliminary chip designs using chip design programs. The device makers give the preliminary chip designs to foundries. The foundries need to create reticles mask sets to make the chips from the preliminary designs. This process is complicated, manual, time consuming and costly.

The importance of overcoming the various deficiencies noted above is evidenced by the extensive technological development directed to the subject, as documented by the relevant patent and technical literature. The closest and apparently more relevant technical developments in the patent literature can be gleaned by considering:

U.S. Pat. No. 6,031,981 (Lee, et al.) describes a system for reconfigurable gate array cells for automatic engineering change orders.

U.S. Pat. No. 6,128,588(Chacon) shows an integrated FAB database and discusses connections to a process control system.

U.S. Pat. No. 6,260,177b1(Lee et al.) discusses tape out processes in reticle fabrication.

U.S. Pat. No. 5,696,943(Lee) shows a method and apparatus for quick and reliable design modification.

SUMMARY OF THE INVENTION

It is an object of example embodiments of the invention to provide an automated tape process and system.

A computer implemented method of modifying layout information representing a reticle set design: the method comprising the steps of:
a) receiving layout information and job information; and storing the layout information and job information;
  the layout information representing a reticle set design for an integrated circuit; and
  the job information related to the reticle set design;
b) modifying the layout information and the job information to put the layout information and the job information into a foundry process compatible format;
c) using the layout information and the job information to create mask writer format information for the reticle set design; and storing mask writer format information; and
d) outputting the mask writer format information.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The features and advantages of a method and system according to the present invention and further details of the method and system in accordance with the present invention will be more clearly understood from the following description taken in conjunction with the accompanying drawings in which like reference numerals designate similar or corresponding elements, regions and portions and in which:

FIG. 2A shows a flowchart that illustrates a non-limiting example embodiment of the automated tapeout support system, method and apparatus of the present invention.

FIGS. 7A, 7B, 7C, 7D, 7E and 7F show screen shots of an example of job information entering and editing screens of the interface according to an example embodiment of the invention.

FIG. 8A shows a view of Bias table of an example embodiment of the invention.

FIG. 8B shows a view of a Frame table of an example embodiment of the invention.

DETAILED DESCRIPTION OF PREFERRED EMBODIMENTS

Illustrative Example

In an illustrative example of an application for an embodiment, a foundry receives a high level chip design (e.g., GDSII Files) for chip design from a customer and must modify the information so that the layout information is compatible with the foundry process standard. The layout information is corrected for incompatible designs and to add in features such as frames. Then the high level chip design (e.g., GDSII Files) are put into a format that can be used to create mask writer machine specific files (E.g., MEBES) that are used to make the reticles sets.

For example, a foundry receives a customer "layout information" representing an integrated circuit layout design (GDSII files/stream) for a device. The foundry can create a related "job info" (e.g., PTRF or Product Tapeout Request Form, e.g., info about the reticle making job) file/database. Then the layout information and job (PTRF) information are used modified/added so that the layout info is converted into a format the foundry can use to produce a reticle set. Often the customer's initial layout info is in a format that is incompatible with the foundry's process standard/format. For example, the customer's GDSII layer info may have a different scheme for numbering the layers that the numbering scheme the foundry uses in the foundry process std/format. Also, often the customer's GDSII layout info may not have a frame (e.g., a kerf) around the chip. The foundry may add frame data to the layout info (GDSII files) to incorporate the frame.

Overview

An embodiment of the automated tapeout support method/system (or Mask data preparation method/system) changes a customer specific reticle set design to a reticle set design that meets a foundry process standard. For example, a customer can send layout information (e.g., GSDII file) for a reticle set to a foundry. In addition, the customer sends Job information related to the reticle set. The customer's (GSDII files/stream) layout info can having a different numbering system of the masking layers compared to the foundry's process standard. For example, the customer's GSDII data may have metal 5 are layer # 5, but the foundry process metal 5 is layer # 8. Also, the customer's layout info does not have OPC (optical proximity correction) corrections (because OPC is often dependent on specific reticle writer.) Customer layout info may does not contain dummy active (dummy regions) generation.

The method/system enables the modification of the customer's GSDII data (layout info) to add other elements, such as frames. Also, preferably the (GSDII) layout data is checked for design rules conformity.

After the system and/or users modify the layout (GSDII) data and job data, the GSDII data is converted to a format for a specific mask writer machine (e.g., MEBES). The mask writer format information (MEBES) is used by a mask shop for the making of the reticle set. The process is described in the flow chart in FIG. 1.

FIG. 1 Overview

Figure 1:
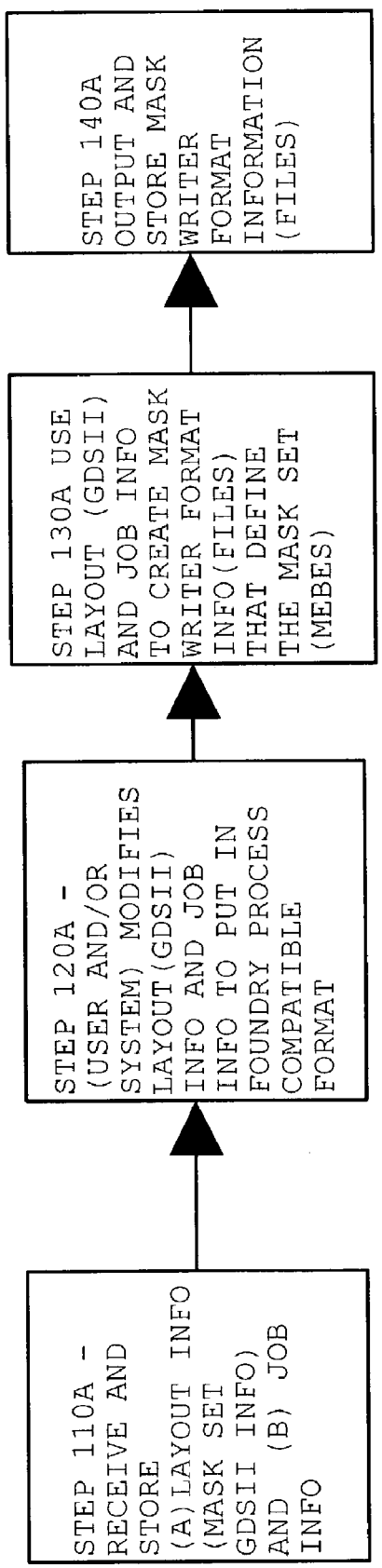
FIG. 1 shows a flowchart that illustrates a non-limiting example embodiment of the automated tapeout support system, method and apparatus of the present invention.

FIG. 1, shows an example embodiment of the invention. As shown in FIG. 1, step 110A, the system receives and stores (a) layout information (Customer mask set GDSII info in the customer's format) and (b) Job info. The automated tapeout support system is preferably comprised of one or more software applications. The system can receive information by, for example, retrieving the information, transferring the information or receiving dated entered by a user or program.

As shown in FIG. 1, step 120A, the system, foundry, and/or customer can modify GDSII info and job info to put in foundry compatible format. Other applications can be used to modify the GDSII Info, including extraction programs. These applications can be considered part of the system. In addition, features (e.g., frame generation, OPC) can be added to the layout info and job info.

A major function of the application/system is to modify the layout info (GSDII) and Job information (PTFR) that initially is in a customer design format to a foundry process compatible format. The term's customer design format and foundry process format mean changing between two different formats and is not limited to a customer and a foundry. The layout information is preferably in Graphic design Stream (GDSII) format. Preferably, the layout information and the job information are received from a customer and the layout information conforms to a customer process standard.

Referring to FIG. 1, step 130A, the system uses the GDSII layout info and Job info to create and store mask writer format information/files (e.g., MEBES) that define the mask set.

Referring to FIG. 1, step 140A, the system outputs the mask writer format information/files, and preferably sends the information to a mask shop where the reticle set can be produced.

The reticle data management system can be comprised of several applications running of one or more computers. The reticle data management system is preferably comprised of a workflow application that is preferably web based.

Example Embodiment—FIG. 2A

Figure 2B:
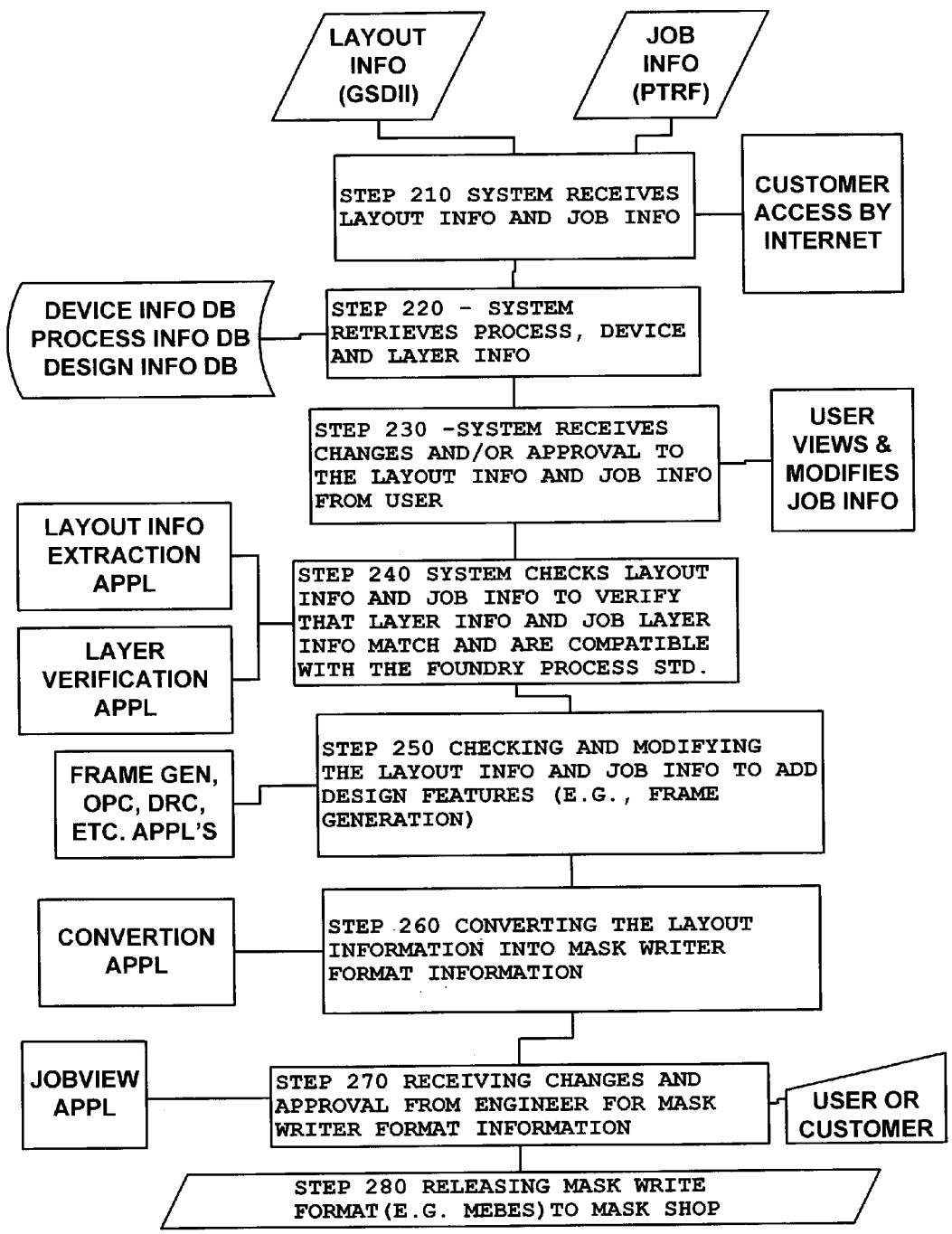
FIG. 2B shows a flowchart that illustrates a non-limiting example embodiment of the automated tapeout support system, method and apparatus of the present invention.

An example embodiment flowchart is shown in FIG. 2A. A more detailed example embodiment is shown in FIG. 2B that shows some of the interactions and connections.

Step (210) Receiving (GSDII) Layout Information Representing a Reticle Set Design for an Integrated Circuit and Job Information Related to the Reticle Set Design As shown in FIG. 2A, step 210, the automated tapeout support (or reticle data management) system receives (a) layout information (e.g., GDSII) representing a reticle set design for an integrated circuit and (b) job information related to the reticle set design. Preferably, the reticle info processing system receives "layout information" and job information from a customer. The customer could send the information by FTP and/or by logging on to the system.

The reticle set design is the design of the photolithography reticles or masks that are used to produce an electric circuit or integrated circuit.

As discussed above, a function of the system is to modify the layout and the job information that initially is in a customer design format to design format compatible with the user's (e.g., foundry or other IC manufacturer) foundry process standard.

The foundry process standard is a set of standards where for example, for a given technology (e.g., 0.18 μm), process types are defined. For example, for a technology of 0.18 μm, a process type #1 might have 5 metal layers with 0.18 μm groundrules. Also see FIG. 5. The process type defines the number and types of layers used. The process type also defines the numbering of the layers (e.g., layer data) in the GSDII layout info. For each integrated circuit device, a technology and process type are selected. From that process type, certain foundry process standards are selected.

For example, the customer's layout info and the job info may have different schemes for numbering the mask layers than the foundry's process standard. Also, often the customer's layout info may not have a frame (e.g., a kerf) around the chip. The user (e.g., foundry) must add frame data to the layout info (GDSII files) to incorporate the frame.

The layout information is preferably in Graphic design Stream (GDSII) format. Preferably, the layout information and the job information are received from a customer and the layout information conforms to a customer design/process standard; the customer design/process standard that differs from a foundry process standard.

In a preferred embodiment, the customer transfers the GDSII files/database to a user's file server.

Layout Information

The layout information (e.g., GDSII) comprises information representing an integrated circuit layout design. The layout info data is preferably stored within a specific format called the GDSII format. The layout information contains information comprising: multiple types of polygons that are drawn in different layer numbers and data types. The layout information is preferably comprised of geometric information and connectivity information regarding transistors and their connections which together represent the IC design. The GDSII is a format for transferring/archiving 2D graphical design data. It contains a hierarchy of structures, each structure containing elements (boundary/polygon, path/polyline, text, box, circle, arc, structure references, structure array references).

Job Information

For each customer reticle job order, a job information (e.g. PTRF form or data) related to the reticle set is created.

FIGS. 7A thru 7F shows screen shots of portions of the data entered into the job information. Below, in the example section near the end of the specification is shown an example of the types of information collected and modified in the job information (PTRF).

The following types of data can be entered into the job information: Device type, process id, bias table (frame dimension and sizing info), name of layout information (GDSII file or Stream data).

FIG. 2B shows the Layout info and Job info connected to the step 210.

Customer can access the reticle management system and enter or send information into the job information (PTRF) database file. This access is preferably over a secure internet connection using encryption.

Step 220—Retrieving Foundry Design Data Related to the Reticle Set Design; the Design Data is Comprised of Process Data, Device Data and Layer Data that is Related to a Foundry Process Standard As a customer or user enters Job information into the system, the system can automatically retrieve additional related information, such as foundry process/design data. As shown in FIG. 2B, the foundry process/design data can comprise: 1) process info, 2) device info and 3) Job layer info (Bias table—See FIG. 8A).

The Device ID is an unique ID that preferably acts as an reference number for a specific order. Based on this unique ID, users can find the process info and job layer info of the device.

The device ID is stored in JOB info (PTRF database).

The retrieved related information is preferably stored in the job info database or file. The foundry design data can reside on the same main computer as the system or on another computer that is linked to the main computer by an network such as an intranet or internet.

The process information describes the design specific information out of the technology offering from a process. For example, the number of metal layers, the ground rule dimensions (0.15 µm). For example, in 0.18 µm process, it supports both analog and digital designs up to six metal layers. Customers, however, may have a digital design with five metal layers.

The device data/information can be stored in a relational database such as an oracle database.

The job layer data/information is related to a foundry process standard and can be retrieved from a bias table. The Bias Table can contain CD cells, scribe line, frame structure polarity, and OPC/PSM information. These information are used for electrical measurement and process monitor purposes.

The job layer information can be stored in a relational database, such as an oracle database.

An example of a foundry process standard is "layer numbering". For example, each metal layer has a foundry assigned number (e.g., $1^{st}$ metal layer is number 210, second metal layer is 220). See job info (PTFR) example at back of specification.

Figure 5:
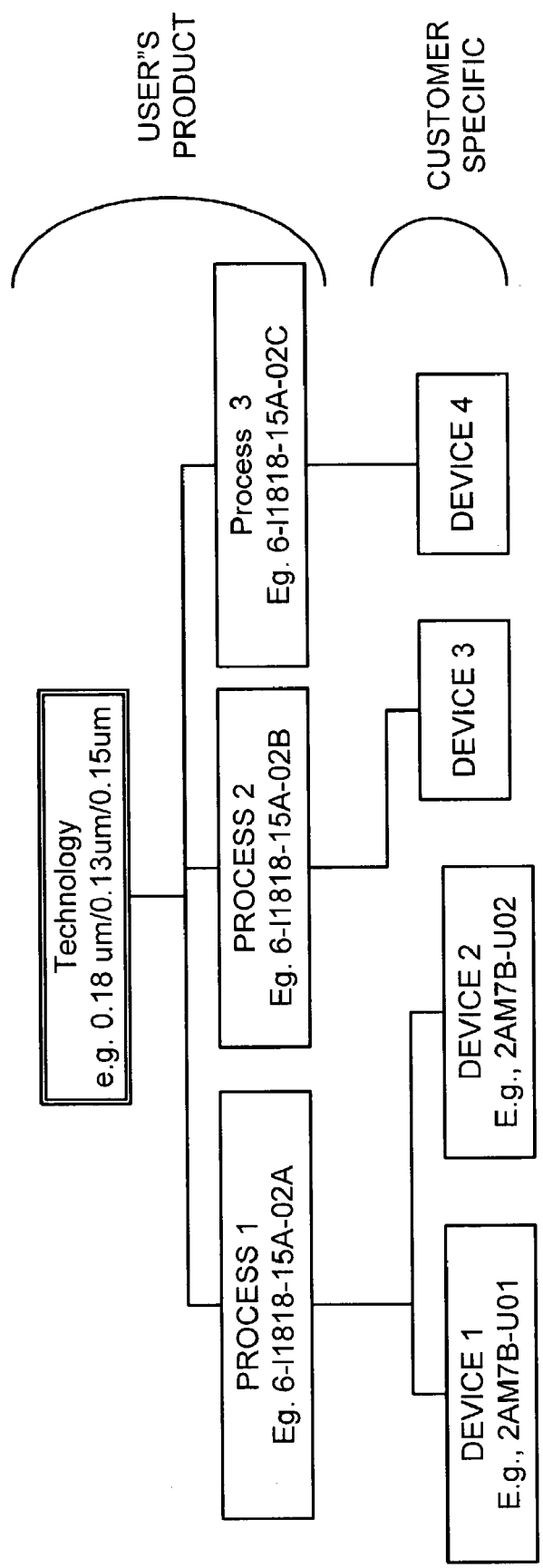
FIG. 5 shows a diagram of a non-limiting example embodiment of a data structure for a master data base including technology, process and device id indexes.

FIG. 5 shows an overview of a foundry (or user's) standards. For a technology (e.g,. 0.18 µm), various "process" are defined. The processes have many standards, such as ground rules, the number of metal layers, etc. When a customer orders a device to be made, a technology is selected, then a process is selected and then customer specific standards are specified by the device design. For the process selected, the system retrieves the appropriate: 1) process info, 2) device info and 3) Job layer info (Bias table).

Step 230—System Receives Changes and/or Approval to the Layout Information and Job Information from an User (e.g., Engineer) so that the Layout Information and Job Information Conform to Foundry Process Standards;

Next, referring to FIG. 2A, and FIG. 2B, step 230, the (1) layout information (GDSII) and Job information (PTRF) are entered by the customer and (2) the process info, device info and layer info retrieved by the system are reviewed and/or modified by an user (preferably a technical person such as an engineer or engineer Account manager (EAM)). The engineer checks to see that the job layer information and layout information are compatible. For example, if the $1^{st}$ metal layer in the customers initial GSDII file has a different layer number than the foundry process standard, then the engineer would change the $1^{st}$ metal layer number in the Job information (PTRF) to reflect the corresponding number used in the customer GDSII file.

The system can receive an approval from an engineer Account manager (EAM) that validates layout info and job info (e.g., PTRF database).

The user or EAM can modify PTRF data to correct incompatibilities between the layout data and job information (PTRF data).

Step 240—Checking and/or Modifying Layout Information and Job Information to Verify that Layer Info and Job Layer Info are Compatible with the Foundry Process Standards Referring to FIGS. 2A and 2B, block 240, the layout information and job information are checked and/or modified to verify that layer info and job layer info are compatible with the foundry process standards. Preferably when a change is made to the layout information, data about the change is recorded in the job info.

Layout Info Extraction Program

The system preferably initiates a (GDSII) layout info extraction program (e.g., GDS—info from K2 Technologies) that extracts information from the layout info (GDSII file) to create a layer verification file (e.g., logfile). The layer verification file tells what layers (numbers and types) are being used and what data types are assigned.

The (GDSII) layout info extraction program is preferably a data extraction program like a script calling up a K2 viewer ™ program from K2 Technologies.

Layer Verification Application

The system then initiates an layer verification application that compares the layer verification file (e.g., logfile) to job info to verify the layer info is correct (i.e., the right number of layers existed in GDSII file and that the layers have the correct numbering for the foundry standard.

The layer verification application can be custom program written by the user to perform this comparison.

Step 250—Checking and Modifying the Layout Info and Job Info to Add Design Features (e.g., Frame Generation)

As shown in FIGS. 2A and 2B, step 250, the system and/or user modifies the (GDSII) layout info and job info to add design features, such as e.g., frame generation, optical proximity corrections (OPC), dummy active layers.

Frame Generation

The (GDSII) layout information and job information are modified to add frames. In a frame generation process, elements such as, test key, alignment mark, CD bar, thickness bar and register are inserted into the GDSII layout info. Preferably the system retrieves frame info files from a Frame table (which is part of foundries process standard (database). The application incorporates frame data into GDSII layout info and Job info (PTFR) database.

Opc

The (GDSII) layout information and job information preferably are modified to make optical proximity corrections (OPC). The system can initiate an OPC application that can modify the GDSII info to make optical proximity corrections (OPC).

Add Dummy Active Layers

Preferably, the layout information and job information are modified to add dummy active layers. The system can modify the GDSII layout information and job information to add dummy active layers.

Design Rule Compliance

Preferably The GDSII layout information is checked for design rule compliance. The layout information preferably is checked for design rule check (DRC) compliance. The system can initiate a design rule check application to run on the GDSII layout info . An example of a design rule check application is Calibre made by Mentor Graphics, USA.

Step 260 Converting the Layout Information into Mask Writer Format Information for the Reticle Set Design. (e.g. MEBES Format (Fracturing))

Referring to FIGS. 2A and 2B, step 260, the system uses the layout information and job information to create mask writer format information (e.g. MEBES format (Fracturing)). The (GDSII) layout conversion to mask-writer formats is the process of converting hierarchical design data in an open, standard hierarchical format to a proprietary format optimized for specific mask-writer equipment.

A program is used to convert the intermediate format (e.g. GSDII) into machine specific form (e.g., MEBES, Jeol51 and BPD). This usually involves flatting the Hierarchy (removing the hierarchy in the GDSII info), polygons are reduced to primitive shapes (e.g., trapezoids or triangles and rectangles) and the pattern is fractured into fields, subfields and even sub-subfields.

Step 270—Receiving Changes and Approval from Engineer for Mask Writer Format Information Referring to block 270, in FIG. 2A, the system receives changes and approval from engineer for Mask writer format information.

Preferably, the system initiates an (e.g., MEBES viewer) application that opens the MEBES layout data and checks data. The application can be a MEBES viewer application of which a variety are available.

The system can initiate the approval process by notifying a customer or foundry technical person, (such as engineer) that the Mask writer format information is ready for review. The user (e.g., technical person such as a customer, or foundry person) could then use the application.

Step 280—Sending the Mask Write Format Info (MEBES) to Mask Shop

Referring to FIGS. 2A and 2B, step 280, the system send the mask write format info (e.g., MEBES) to mask shop MEBES data sent to mask shop and used by manufacturers to manufacture masks.

The machine specific data (e.g., MEBES) is preferably sent by FTP on the internet to the mask shop. The mask shop manufactures the reticles using the machine specific data.

A tape-out is the approval of a physical design layout as a GDSII stream that is sent to a mask house to produce the mask set for semiconductor manufacturing of a chip design.

Configuration and Software

In a preferred embodiment, the reticle data management system is comprised of a workflow application such as Windchill by Parametric Technology Corp. The workflow application an interact with other applications and databases. The workflow program can send and receive communications with persons such as foundry personnel, customers, field engineers, Account managers, tapeout center personnel, masks shop personnel, etc.

Figure 6:
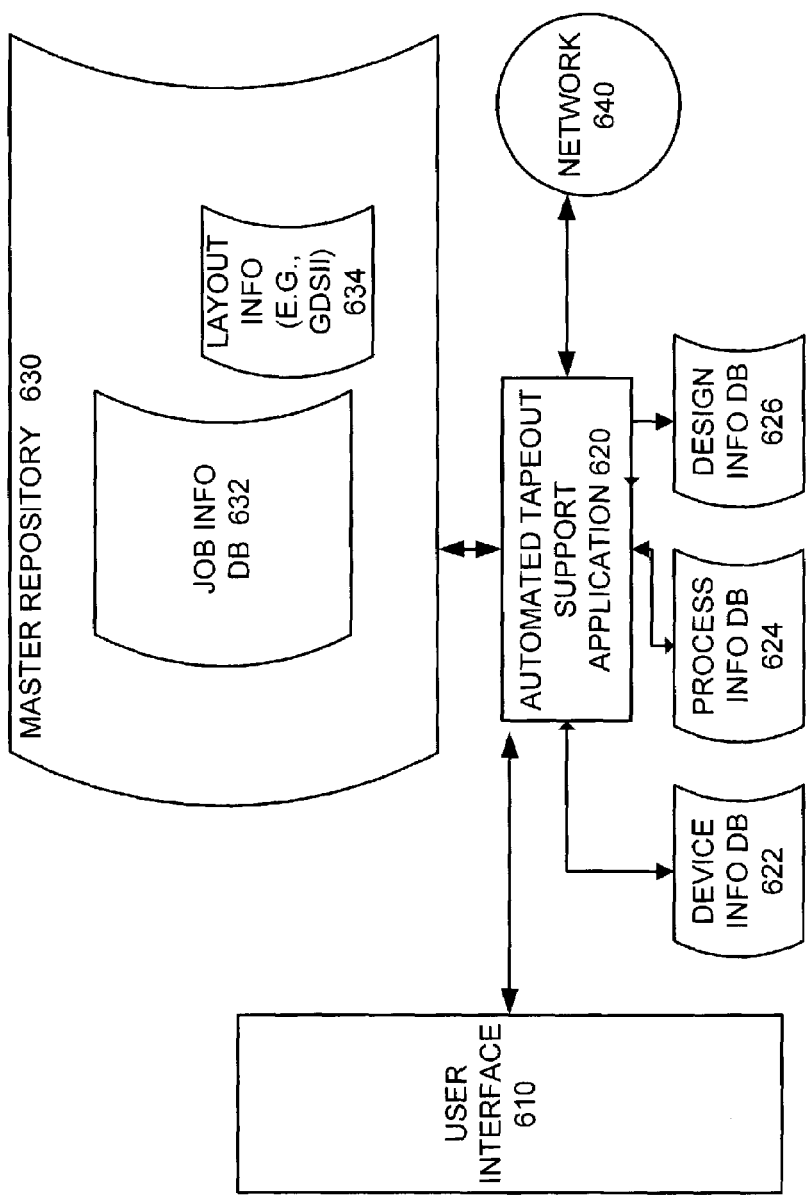
FIG. 6 shows a diagram of an example of a system configuration for an embodiment of the invention.

FIG. 6 shows an example diagram of a configuration embodiment. FIG. 6 shows the automated tapeout support application 620 connected to the device info database (db) 622, process info db 624 and design info database, (e.g., bias tables). The application 620 is preferably connected to a network such as a intranet or internet. The application has a user interface 610. The application has access to a master data repository 630 (e.g., a windchill TM database). The master data repository 630 can contain the job info db 632 (e.g., PTFR data) and the layout info database (where the GDSII data stream is stored).

Figure 3:
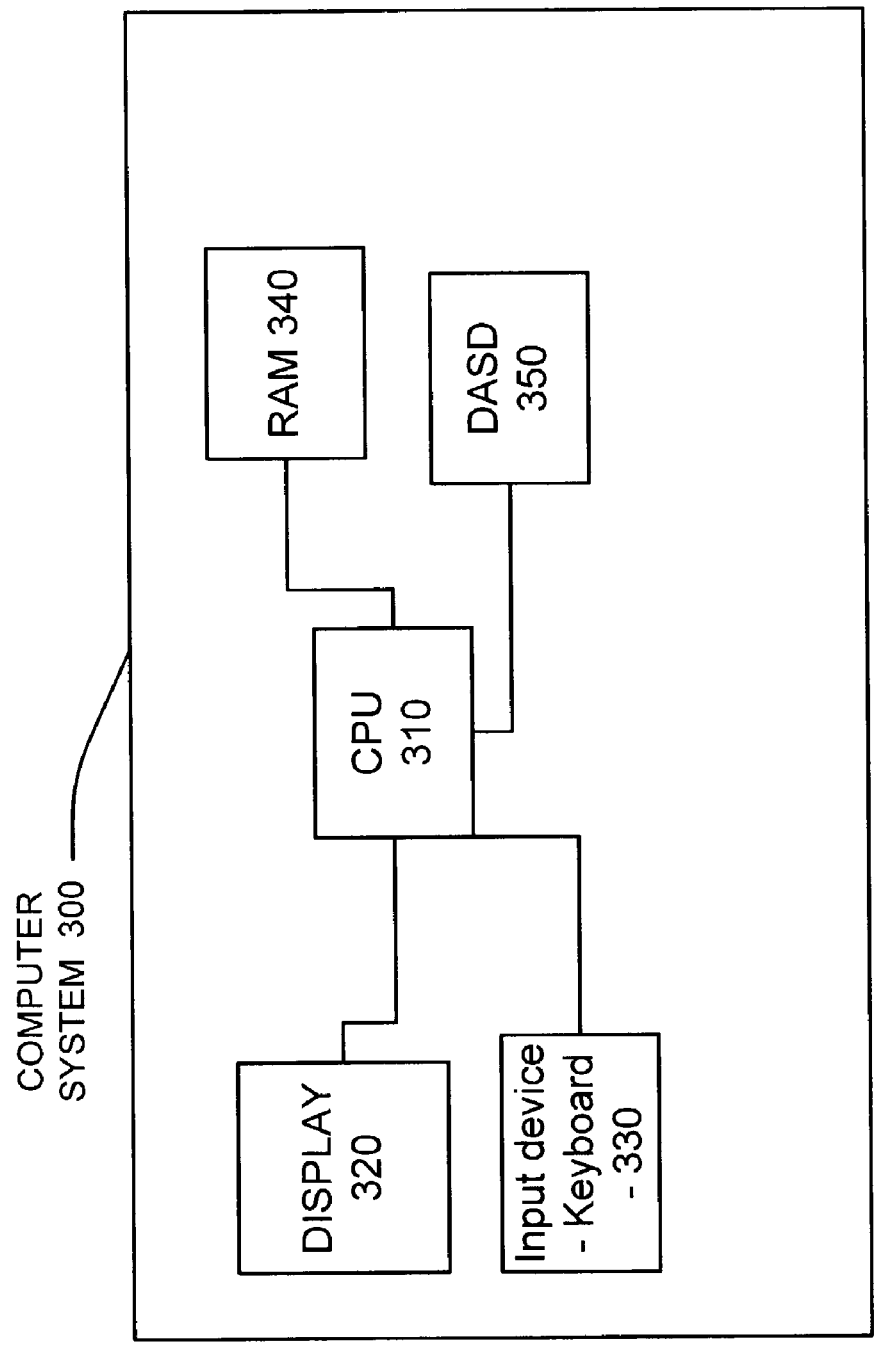
FIG. 3 shows a diagram of a non-limiting example embodiment of a computer that can be used in an embodiment of the invention.
Figure 4:
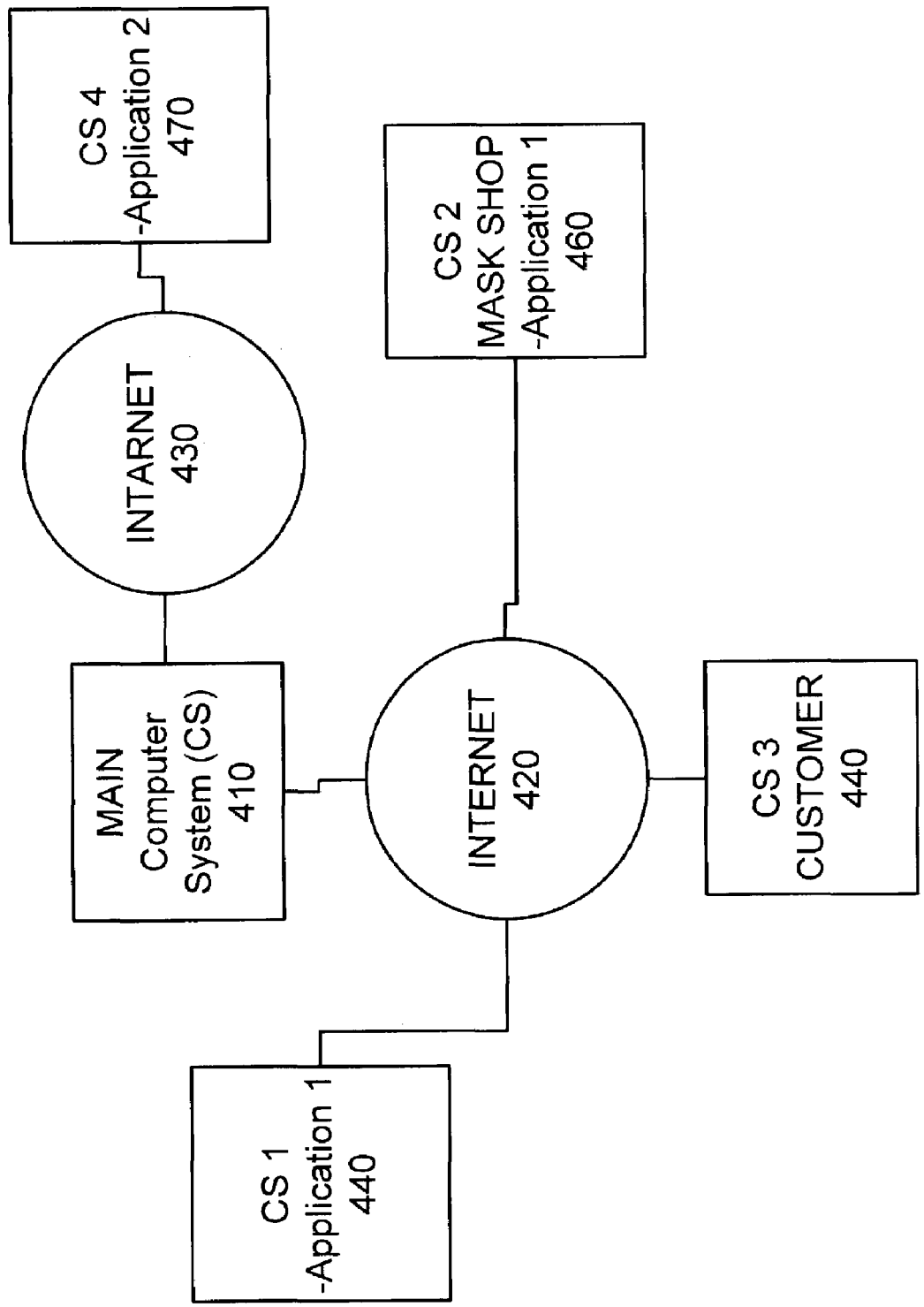
FIG. 4 shows a diagram of a non-limiting example embodiment of a computer system that can be used in an embodiment of the invention.

FIGS. 3 and 4—Overview of System Configuration

The computer application (e.g., automated tapeout support or reticle workflow management application) in accordance with an embodiment is preferably resident in a site in the fabrication plant computer system.

Referring to FIG. 3, the central computer system 300 shown in FIG. 3 comprises a CPU (Central Processing Unit) 310, a terminal with a monitor 320 connected to the CPU 310 for receiving data from the CPU 310 and a input device (e.g., keyboard) 330 connected to the CPU 310 for sending data respectively to the CPU 310. A RAM (Random Access Memory) 340 and a DASD 350 associated with the CPU are shown connected for bidirectional communication of data to and from CPU.

As shown in FIG. 4, a system configuration upon which an embodiment of the invention can be implemented is shown. FIG. 4 shows main computer system 410 connected to the internet 420 and an intranet 410. The workflow program of the invention that manages the workflow can reside on the main computer. The program can be accessed in many locations by connecting thru the internet or intranets. A first computer system (CS1) 440 can be connected to the internet and be used to run applications initiated by the main computer 410. For example, the CS1 could be used to store and retrieve system retrieves process, device and layer info as shown in FIG. 2, step 120.

A mask shop could access the automated tapeout support system (reticle data management system)/application(s) running on CS1 410 over the internet using a second computer system 460 preferably using a web based browser.

Another user could access the automated tapeout support system running on CS1 410 over an intranet 420 using a fourth computer system 470 preferably using a web based browser. The application for the fracturing (FIG. 2B—step 160) (converting the layout information into mask writer format information) could run on this computer.

Also, a customer could access the automated tapeout support system running on CS1 410 over the internet using a third computer system 440 preferably using a web based browser.

Example Screen Shots for Job Information (PTRF)

FIGS. 7A to 7F illustrate sample screen shots for the creation of the PTRF (e.g., job info).

FIG. 7A shows a screen where Customer info and Device information are entered or selected. A customer id is selected. other related customer info such as primary contact name can be entered. In the selection window, device id's for that customer can be selected. A process id related to the device id can be retrieved by the system or manually entered. Finally, a click on the "generate process info" button causes the system to retrieve process information as shown in the following screens. (See e.g., FIG. 2B, step 220).

Figure 7B:
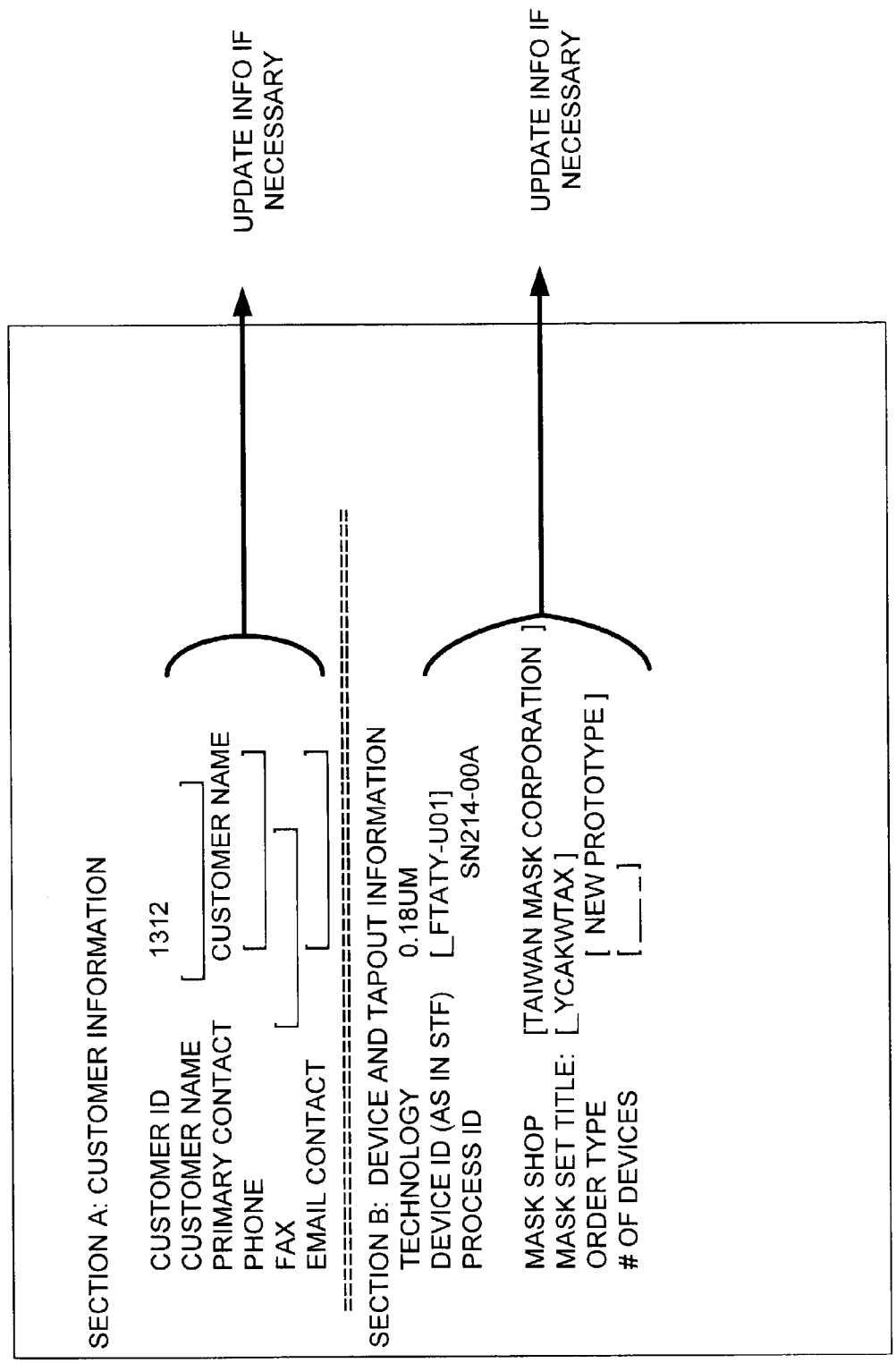

Referring to FIG. 7B, the customer information is retrieved and can be manually updated by the user. In section B, the technology, device id and process id are retrieved from the device info database (see FIG. 5) and FIG. 2B, step 220). The USER can enter the: mask shop, mask set title, order type(drop down box) and # of devices.

As shown in FIG. 7C, the user can select whether to insert a scribe line, the customer PO #, and the other fields as shown in FIG. 7C.

As shown in FIGS. 7D and 7E, the fields are filled in by the user before the job is submitted to tapeout.

Referring to FIG. 7F, in the Job info form (PTFR create form) the system retrieves the layer info associated with the device id and displays the info on the screen (user interface) where the data can be edited. Any changes are stored in the job info database.

FIG. 8A—Bias Table

FIG. 8A shows an example of the data in a Bias Table. As shown in FIG. 8A, more than 1 process can used the same bias table.

It is possible to integrate the embodiment application with other systems such as pricing systems. The data in the job information and layout information (data repositories)could used by a reticle pricing application.

FIG. 8B—Frame Table

FIG. 8B shows a view of a Frame table of an example embodiment of the invention.

Non-limiting Descriptions

Layout information—(e.g., GDSII) contains geometry and connectivity for mask set design.

Job information (PTFR)—Product Tapeout Request Form—contain information related to the reticle set job Mask set—set of layer or reticles used to fabricate a integrated circuit mask writer format information—machine specific form (e.g., MEBES, Jeol51 and BPD) used by mask writer tools (e.g., e-beam) to manufacture reticles.

GDSII—graphic design stream format.

Foundry—manufacturer of semiconductors—can be any organization that is directing or involved with the production of masks by accepting an initial layout info (GDSII) from a customer and creating a modified layout information that conforms to a set of manufacturing process standards.

Automated tapeout support system—preferably comprised of one or more software applications preferably including a workflow program.

EXAMPLES

Example A—Job Information

Below is an example printout of a portion of information contained in the job information (PTRF). Example of Job Information (E.g. PTRF). The job information is preferably comprised of a file or database that contains information such as shown below.

Product Tapeout Request 1312-286
Order Number: PTRF-1312-286 Order Date: 03/Oct/2002

Section A: Customer Information
Customer ID: 1312
Customer Name: STMICROELE LTD
Primary Contact:
E-Mail Contact: null
Telephone Number: 1796
Fax Number: null Section B: Device and Tapeout Information

| Technology: | 0.18 µM | Fab: | 6 |
|---|---|---|---|
| Device ID (as in STF): | YCAKWTAX-U)1 TOPPAN | Process ID (as in BX024): | 6-S1818-12L 102-05A |
| Maskshop: | CHUNGHWA ELECTRONICS CO LTD | Mask Set Title: | YCAK WTAX |
| Maskshop ID: | 18881 | | |
| Order Type: | New Prototype | | |
| # of Devices(for MPW only): | | Scribe Line Drop | No |

-continued

| | |
|---|---|
| Bias Table Spec: | SP-YI-09103 BT002 |
| Bias Table Spec Rev: | 1 D |
| Recoverable?: | No |
| Raise Reticle PO?: | No |
| Customer to Jobview?: | No |
| Jobview Gating by Customer?: | NO |
| Starting Material (EPI?): | No |
| Starting Material | 2ERWF 1010 |
| Customer PO Number: | I90sox1 |
| Submission Reason: | New Prototyp |
| Customer Floor Plan: | No |
| Polymide: | No |
| Spice Model Specification Used: | NIL |
| Spice Model Spec Rev: | NIL |
| Design Rule Specification Used: | YI-093-DR001 |
| Design Rule Spec Rev: | 11 |
| ET Specification Used: | S M-TX-0412 ET001 |
| ET Spec Rev: | 1A |
| Library Used: | No |
| Advant!: | No |
| Std. Cell: | No |
| Artisan: | No |
| Std. Cell: | No |
| Virage: | No |
| Memories: | No |
| Other IP.: | No |
| Details: | |
| Backgrind Thickness: | None |
| Tapeout Format: | GDSII |

Section C: Tapeout Information for Tapeout Centre

| | |
|---|---|
| Prime Status: | WIP |
| Frame Status: | WIP |
| Job View Status: | WIP |
| Tapeout Order Status: | In " |
| Expected Completion Date: | Oct. 05, 2002 |
| Job Wait Time: | 0.0 |
| STF Date: | |
| Data Prep Date: | 03/C |
| Actual Completion Date: | |
| DRC Review Date: | |
| Frame Completion Date: | |
| Request Submission Date: | 03/C |
| DRC Start Date: | Oct. 03, 2002 |
| Job View Completion Date: | |
| Prime Start Date: | Oct. 03, 2002 |
| Release to Maskshop Date: | |
| Release to Maskmaking CAD License: | |
| PTRF Job Runtime: | 0 |

Section D: Design Rule Check Information

First Tapeout to Chartered?: No

Path1?:No

Chartered runs DRC?: No

Section E: Frame Information

| | |
|---|---|
| Guardring added by Chartered? | |
| No Space to Guardring: | 0.0 um |
| Chartered Default Assembly Die size increment is 10 μM. | |

Section F: GDSII Format Database Tapeout Header Information

| | |
|---|---|
| Top Cell Name: | FF_CAKW |
| Anti Clockwise Orientation: | 90 Degree/s |
| Database scale: | undefined X |
| E-Beam Shrink to: | 100.0% |

FTP Information

| | |
|---|---|
| Tapeout Region: | Singapore |
| FTP Site: | ftp.charter |
| FTP Directory: | /to_csm |
| GDS File Name: | FF CAKV |
| GDS Upload Date: | Sep. 09, 2002 |
| FTP File Size(in bytes): | 1278462 |
| Final FTP File Size(in bytes): | 1278462 |

Window Co-ordinates (in Microns)

Lower left hand X coordinate: −1465.0

Upper right hand X coordinate: 1465.0

Lower left hand Y coordinate: −782.5

Upper right hand Y coordinate: 782.5

Layer Information (Only Partial Table Shown)

| Mask Layer No. | Mask Layer Name | OPC/ PSM | Sizing per Side | Digitized Area Polarity | Cust. GDSII# Type | Data | Cust. DB Grid Size | Logical Operation | Final Cust. Structure CD |
|---|---|---|---|---|---|---|---|---|---|
| 10 | comp | OPC | 0.00 | dark | 2 | 0, 4, 30, 31, 32 | 0.0050 | Chartered | 0.005 |
| 05 | n-well | none | 0.00 | clear | NIL | 0 | 0.01 | Usr_Layer1 | 0.0 |
| 15 | p-field | none | 0 | dark | NIL | 0 | 0.01 | Chartered | 0.01 |
| 6c | n-pthu imp | None | | clear | 11 | 0, 31 | 0.01 | nil | 0.01 |

-continued

| Mask Layer No. | Mask Layer Name | OPC/ PSM | Sizing per Side | Digitized Area Polarity | Cust. GDSII# Type | Data | Cust. DB Grid Size | Logical Operation | Final Cust. Structure CD |
|---|---|---|---|---|---|---|---|---|---|
| 64 | Thin gate | None | 0.00 | clear | 15 | 0, 30, 31, 32 | 0.01 | NIL | 0.0 |
| 61 | Thin Ngate | none | | clear | 14 | 0, 30, 31, 32 | 0.01 | NIL | 0.0 |
| 78 | Li | opc + pSM (6%) | 0.03 | clear | 39 | 0, 31, 32 | 0.05 | Chartered | .0050 |
| 85 | VIA | None | 0.0 | clear | ·25 | 0, 30, 31 32 | 0.0050 | Std. Chartered | 0.005 |

Marking Layer Information

| Marking Layer Name | Purpose | GDS# | DATA Type | Logical Operation |
|---|---|---|---|---|
| SRAM_MK | SRAM Core Cell Marking Layer: | NIL | 0 | (((MARK1 OI MARK3) @ ( |
| EEPROM_MK | E EPROM Marking Layer for DRC: | NIL | 0 | 0 |
| DA_EXCL | Dummy Active Exclude Marking Layer: | NIL | 0 | [(−1465, −782.5) (1465,782)] |
| RES_MK~ | NWELL Resistor Marking Layer: | 112 | 0 | |
| FUSE_MK | Fuse Marking Layer: | NIL | 0 | 1 |
| DPM_EXCL | DPM Poly/Metal Exclude Marking Layer: | NIL | 0 | |
| Mark1 | Active Sram Mark | 2 | 30 | |
| Mark2 | Poly Sram Mark | 13 | 30 | |
| Mark3 | Metal 1 Sram Mark | 23 | 30 | |
| Mark4 | | NIL | 0 | 0 |
| Mark5 | | NIL | 0 | 1 |

Remarks

Tapeout Remarks:

Customer Remarks/Reason for Change:

CEAMIFE Remarks/Reason for Change:

Associated Documents Attachments:

References:

| | |
|---|---|
| Name | Prime GDS File for PTRF-1312-286 |
| Number | PTRF-1312 286 1446624075 |
| Type | WTDocument Master |
| Last Updated | Oct. 03, 2002 21:31:15 CST |
| Print. Preview | |
| Audit Trail | |

While the invention has been particularly shown and described with reference to the preferred embodiments thereof, it will be understood by those skilled in the art that various changes in form and details may be made without departing from the spirit and scope of the invention. It is intended to cover various modifications and similar arrangements and procedures, and the scope of the appended claims therefore should be accorded the broadest interpretation so as to encompass all such modifications and similar arrangements and procedures.

What is claimed:

1. A computer implemented method of modifying layout information representing a reticle set design, the method comprising the steps of:

a) receiving layout information and job information; and storing said layout information and job information;

said layout information representing a reticle set design for an integrated circuit, and said job information related to said reticle set design; the reticle set design is comprised of layers;

said layout information conforms to a customer process standard; and said customer process standard differs from a foundry process standard; the foundry process standard defines at least a foundry scheme for numbering the layers, types of layers, total number of layers, the total number of metal layers and the ground rules;

b) modifying said layout information and said job information to put said layout information and said job information into said foundry process format;

c) using said layout information and said job information to create mask writer format information for said reticle set design; and storing the mask writer format information; and d) outputting said mask writer format information.

2. The method of claim 1 wherein step a) further comprises:

said layout information and said job information is received from a customer.

3. The method of claim 1 wherein steps a) and b) further comprises: said layout information is in a Graphic Design Stream format.

4. The method of claim 1 wherein step (b) further comprises:
   a) retrieving foundry design data related to said reticle set design;
      (1) said foundry design data is comprised of process data, device data and layer data that is related to foundry process standards;
   b) receiving changes and/or approval to said layout information and job information whereby the layout information and job information conform to foundry process standards;
   c) checking said layout information and said job information to verify that said layout information and said job layer information are compatible with said foundry process standards;
      (1) the checking of said layout information and job information comprises (a) using a layout information extraction program to extract layer names and layer numbers; and (b) an layer verification application that verify said layer names and said layer numbers are compatible with said job information.

5. The method of claim 1 wherein step (b) further comprises: checking and/or modifying said layout info and job information to add features;
   said layout information is modified to add frame layout info;
   said layout information and said job information are modified to make optical proximity corrections;
   said layout information and job information are modified to add dummy active layers;
   said layout information is checked for design rule compliance.

6. The method of claim 1 which further includes after step (d):
   receiving changes and/or approval for said mask writer format information; and
   releasing the mask writer format information to a mask shop.

7. A computer readable medium storing a computer program implementing the method of claim 1.

8. The method of claim 1 wherein step (b) further includes:
   modifying said layout information and said job information to put said layout information and said job information into said foundry process format by modifying at least one of the following: the layer numbers, the types of layers, numbering scheme the mask layers, the total number of metal layers or the ground rules.

9. A computer implemented method of modifying layout information representing a reticle set design for an integrated circuit, the method comprising the steps of:
   a) receiving and storing layout information representing a reticle set design for an integrated circuit and job information related to said reticle set design; the reticle set design is comprised of layers;
      (1) said layout information is in Graphic Design Stream format;
      (2) said layout information is in Graphic Design Stream format and is received from the internet;
      (3) said layout information conforms to a customer process standard; a foundry process standard defines at least a foundry scheme for numbering the layers, types of layer, total number of layers, the total number of metal layers and the ground rules; said customer process standard differs from a the foundry process standard;
   b) retrieving foundry design data related to said reticle set design;
      (1) said foundry design data is comprised of process data, device data and layer data that is related to foundry process standards;
   c) receiving changes and/or approval to said layout information and job information to change said layout information and said job information from conforming to said customer process standard to conform to said foundry process standard;
   d) checking said layout information and said job information to verify that said layout information and said job layer information are compatible with said foundry process standards;
      (1) the checking of said layout information and job information comprises (a) using a layout information extraction program to extract layer names and layer numbers; and (b) an layer verification application that verify said layer names and said layer numbers are compatible with said job information;
   e) checking and modifying said layout info and job information to add features;
      (1) said layout information is modified to add frame layout info;
      (2) said layout information and said job information are modified to make optical proximity corrections;
      (3) said layout information and job information are modified to add dummy active layers;
      (4) said layout information is checked for design rule compliance;
   f) using said layout information and said job information that conform to said foundry process standard to create mask writer format information for said reticle set design and storing said mask writer format information;
   g) receiving changes and/or approval for said mask writer format information;
   h) releasing the mask write format information to a mask shop.

10. A computer readable medium storing a computer program implementing the method of claim 9.

11. The method of claim 9 wherein step (c) further includes
   receiving changes and/or approval to said layout information and job information to change said layout information and said job information from conforming to said customer process standard to conform to said foundry process standard by modifying at least one of the following: the layer numbers, the types of layers, numbering scheme the mask layers, the total number of metal layers or the ground rules.

12. One or more processor readable storage devices having processor readable code embodied on said process readable storage devices, said processor readable code for programming one or more processors to perform a method for modifying layout information for a reticle set design, the method comprising:
   a) receiving layout information and job information; and storing said layout information and job information;
      said layout information representing a reticle set design for an integrated circuit;
      and said job information related to said reticle set design;
      said layout information conforms to a customer process standard; and said customer process standard differs from a foundry process standard; the foundry process standard defines at least a foundry scheme for numbering the layers, types of layer, total number of layers, the total number of metal layers and the ground rules;
b) modifying said layout information and said job information to put said layout information and said job information into said foundry process format;
c) using said layout information and said job information to create mask writer format information for said reticle set design; and storing mask writer format information; and
d) outputting said mask writer format information.

13. One or more processor readable storage devices having processor readable code embodied on said process readable storage devices, said processor readable code for programming one or more processors to perform a method for modifying layout information for a reticle set design, the method comprising:
   a) receiving and storing layout information representing a reticle set design for an integrated circuit and job information related to said reticle set design;
   b) said layout information and said job information is received from a customer and said layout information conforms to a customer process standard; said customer process standard differs from a foundry process standard; the foundry process standard defines at least a foundry scheme for numbering the layers, types of layers, total number of layers, the total number of metal layers and the ground rules;
   c) retrieving foundry design data related to said reticle set design;
   d) receiving changes and/or approval to said layout information and job information whereby the layout information and job information conform to foundry process standards;
   e) checking said layout information and said job information to verify that said layout information and said job layer information are compatible with said foundry process standards;
   f) chucking and modifying said layout info and job information to add features;
   g) using said layout information and said job information to create mask writer format information for said reticle set design and storing said mask writer format information;
   h) receiving changes and/or approval for said mask writer format information; and
   i) releasing the mask writer format information to a mask shop.

14. One or more processor readable storage devices having processor readable code embodied on said process readable storage devices, said processor readable code for programming one or more processors to perform a method for modifying layout information for a reticle set design, the method comprising:
   a) receiving and storing layout information representing a reticle set design for an integrated circuit and job information related to said reticle set design; the reticle set design is comprised of layers;
      (1) said layout information is in Graphic Design Stream format;
      (2) said layout information is in Graphic Design Stream format and is received from the internet.
      (3) said layout information conforms to a customer process standard; a foundry process standard defines at least a foundry scheme for numbering the layers, types of layers, total number of layers, the total number of metal layers and the ground rules; said customer process standard differs from a the foundry process standard;
   b) retrieving foundry design data related to said reticle set design;
      (1) said foundry design data is comprised of process data, device data and layer data thaL is related to said foundry process sLandards;
   c) receiving changes and/or approval to said layout information and job information to change said layout information and said job information from conforming to said customer process standard to conform to said foundry process standard;
   d) checking said layout information and said job information to verify that said layout information and said job layer information are compatible with said foundry process standards;
      (1) the checking of said layout information and job information comprises (a) using a layout intbrmation extraction program to extract layer names and layer numbers; and (b) a layer verification application that verify said layer names and said layer number are compatible with said job information.
   e) checking and modifying said layout info and job information to add features;
      (1) said layout information is modified to add frame layout info;
      (2) said layout information and said job information are modified to make optical proximity corrections;
      (3) said layout information and job information are modified to add dummy active layers;
      (4) said layout information is checked for design rule compliance;
   f) using said layout information and said job information that conform to said foundry process standard to create mask writer format information for said reticle set design and storing said mask writer format information;
   g) receiving changes and/or approval for said mask writer format information; and
   h) releasing the mask write format information to a mask shop.

15. A computer system for modifying layout information representing a reticle set design, the method comprising the steps of:
   a) receiving and storing layout information representing a reticle set design for an integrated circuit and job information related to said reticle set design;
      (1) said layout information conforms to a customer process standard; a foundry process standard defines at least a foundry scheme for numbering the layers, types of layers, total number of layers, the total number of metal layers and the ground rules; said customer process standard differs from a foundry process standard;
   b) retrieving foundry design data related to said reticle set design;
   c) receiving changes and/or approval to said layout information and job information to change said layout information and said job inftrmation from conforming to said customer process standard to conform to said foundry process standard;
   d) checking said layout information and said job information to verify that said layout information and said job layer information are compatible with said foundry process standards;

e) checking and modifying said layout info and job infonnation to add features;
f) using said layout information and said job information to create mask writer format information for said reticle set design and storing said mask writer format information;
g) receiving changes and/or approval for said mask writer format information;
h) releasing the mask write format information to a mask shop.

* * * * *

UNITED STATES PATENT AND TRADEMARK OFFICE
CERTIFICATE OF CORRECTION

| | | |
|---|---|---|
| PATENT NO. | : 7,069,533 B2 | Page 1 of 1 |
| APPLICATION NO. | : 10/389718 | |
| DATED | : June 27, 2006 | |
| INVENTOR(S) | : Kochpatcharin et al. | |

It is certified that error appears in the above-identified patent and that said Letters Patent is hereby corrected as shown below:

Title page item "(73) Assignee:", "Chatered Semiconductor" should read --Chartered Semiconductor--.

Claim 9, col. 16, line 2, please delete the "a" before "the".

Claim 13, col. 17, line 41, "chucking" should read --checking--.

Claim 14, col. 17, line 64, "internet." should read --internet;--.

Claim 14, col. 18, line 8, "thaL" should read --that--.

Claim 14, col. 18, line 9, "sLandards" should read --standards--.

Claim 14, col. 18, line 21, "intbrmation" should read --information--.

Claim 14, col. 18, line 24, "information." should read --information;--.

Claim 15, col. 18, line 61, "inftrmation" should read --information--.

Claim 15, col. 19, line 2, "infonnation" should read --information--.

Signed and Sealed this

Seventeenth Day of April, 2007

JON W. DUDAS
*Director of the United States Patent and Trademark Office*